| (12) United States Patent
Troop et al.

(10) Patent No.: US 11,506,087 B2
(45) Date of Patent: Nov. 22, 2022

(54) GAS TURBINE ENGINE MAINTENANCE STAND

(71) Applicant: ROLLS-ROYCE plc, London (GB)

(72) Inventors: Steven Troop, Derby (GB); Michael Hardy, Derby (GB); Thomas Jepson, Derby (GB)

(73) Assignee: ROLLS-ROYCE PLC, London (GB)

( * ) Notice: Subject to any disclaimer, the term of this patent is extended or adjusted under 35 U.S.C. 154(b) by 264 days.

(21) Appl. No.: 16/824,805

(22) Filed: Mar. 20, 2020

(65) Prior Publication Data
US 2020/0308988 A1 Oct. 1, 2020

(30) Foreign Application Priority Data
Mar. 29, 2019 (GB) .................................... 1904433

(51) Int. Cl.
*F01D 25/28* (2006.01)
*F02C 7/20* (2006.01)
*B64F 5/50* (2017.01)

(52) U.S. Cl.
CPC .............. *F01D 25/285* (2013.01); *F02C 7/20* (2013.01); *B64F 5/50* (2017.01);
(Continued)

(58) Field of Classification Search
CPC .......... B64F 5/50; F01D 25/285; F01D 25/28; F02C 7/20; F05D 2260/02; F05D 2230/68; F05D 2230/70; F05D 2230/72
See application file for complete search history.

(56) References Cited

U.S. PATENT DOCUMENTS 5,383,652 A 1/1995 Van den Berg
7,770,292 B2 8/2010 Stretton
(Continued)

FOREIGN PATENT DOCUMENTS

DE 10216258 A1 4/2003
EP 1878662 A1 1/2008
(Continued)

OTHER PUBLICATIONS

Aug. 6, 2020 extended Search Report issued in European Patent Application No. 20162598.5.
(Continued)

*Primary Examiner* — Todd E Manahan
*Assistant Examiner* — David P. Olynick
(74) *Attorney, Agent, or Firm* — Oliff PLC

(57) ABSTRACT

A gas turbine engine maintenance stand for a gas turbine engine that comprises modules including an engine core module that houses a high pressure compressor and a turbine module that houses a low pressure turbine. The gas turbine engine maintenance stand has a pair of base beams, each base beam having a first end, a midsection and a second end. The stand has an engine core module support that straddles the pair of base beams at their midsection, the engine core module support having engine core module support arms that are configured to engage opposing sides of the engine core module of the gas turbine engine. The stand also has a turbine module support that straddles the pair of beams adjacent their second ends, the turbine module support having turbine module support arms that are configured to engage opposing sides of the turbine module of the gas turbine engine. The gas turbine engine maintenance stand is useful for disassembling and reassembling modules of a gas turbine engine in order to maintain the gas turbine engine for safety and performance purposes.

16 Claims, 17 Drawing Sheets

(52) U.S. Cl.
CPC .... *F05D 2220/323* (2013.01); *F05D 2230/68* (2013.01); *F05D 2230/70* (2013.01); *F05D 2230/72* (2013.01); *F05D 2260/02* (2013.01); *F05D 2260/40311* (2013.01)

(56) References Cited

U.S. PATENT DOCUMENTS

| | | | |
|---|---|---|---|
| 9,714,585 B2 | 7/2017 | Morey et al. | |
| 10,221,724 B2 | 3/2019 | Murphy et al. | |
| 2008/0011932 A1 | 1/2008 | Stretton | |
| 2009/0294625 A1 | 12/2009 | Fernley et al. | |
| 2013/0306830 A1* | 11/2013 | Acuna | F01D 25/28 280/400 |
| 2015/0135535 A1* | 5/2015 | Hallam | F02C 7/20 29/889.1 |
| 2015/0136935 A1* | 5/2015 | Hallam | F01D 25/285 248/554 |
| 2015/0316197 A1* | 11/2015 | Morey | B62B 3/001 248/556 |
| 2016/0376015 A1* | 12/2016 | Lacko | B64D 29/06 29/888.012 |
| 2017/0107858 A1 | 4/2017 | Murphy et al. | |
| 2018/0142576 A1 | 5/2018 | Dervaux et al. | |
| 2018/0311808 A1 | 11/2018 | Baucher et al. | |
| 2019/0153900 A1 | 5/2019 | Murphy et al. | |
| 2019/0322391 A1* | 10/2019 | Lamadon | B64F 5/50 |

FOREIGN PATENT DOCUMENTS

| | | |
|---|---|---|
| EP | 3156616 A1 | 4/2017 |
| FR | 2370616 A1 | 6/1978 |
| FR | 2 990 190 A1 | 11/2013 |
| GB | 2 509 230 A | 6/2014 |
| WO | 2017/020882 A1 | 2/2017 |

OTHER PUBLICATIONS

Goh, S. S. S., "Sustainment of Commercial Aircraft Gas Turbine Engines: An Organizational and Cognitive Engineering Approach," Massachusetts Institute of Technology, Jun. 2003, pp. 1-160.
Combine Search Report and Examination Report of the Intellectual Property Office of the United Kingdom for GB1904433.8 dated Sep. 17, 2019.

* cited by examiner

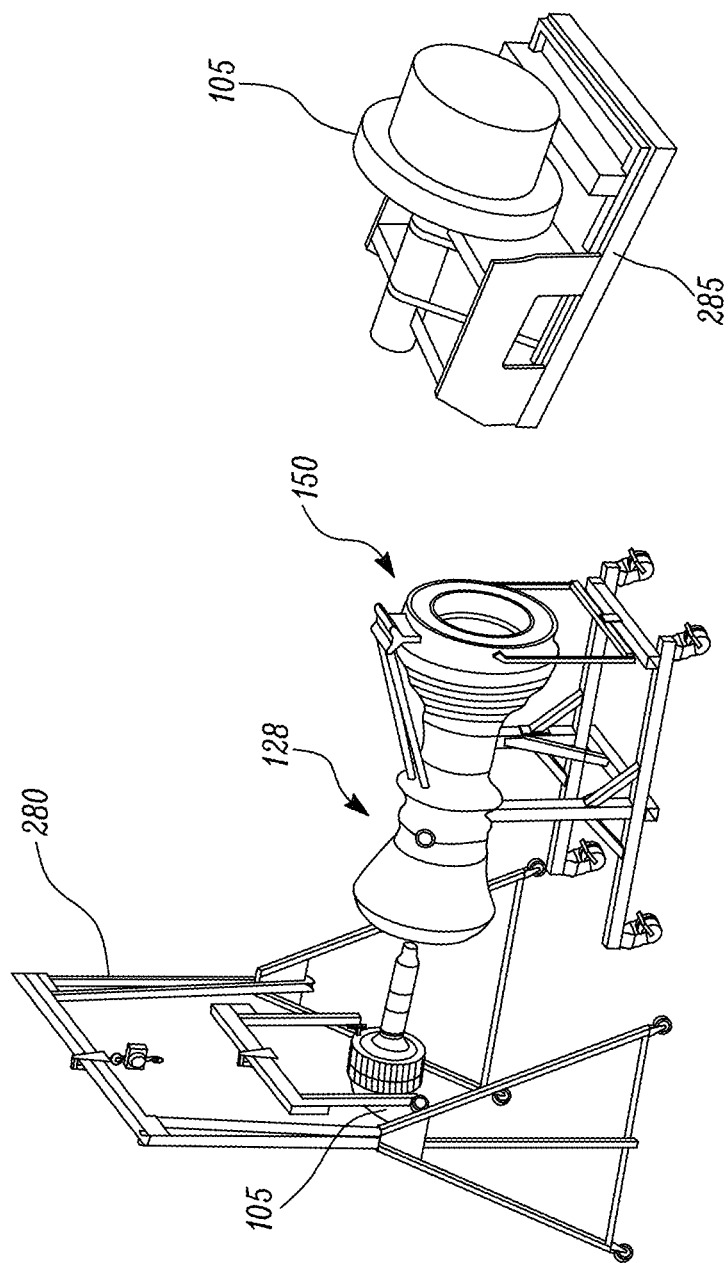

GAS TURBINE ENGINE MAINTENANCE STAND

CROSS-REFERENCE TO RELATED APPLICATIONS

This specification is based upon and claims the benefit of priority from United Kingdom patent application number GB 1904433.8 filed on Mar. 29, 2019, the entire contents of which is incorporated herein by reference.

BACKGROUND

Field of the Disclosure

The present disclosure concerns a gas turbine engine maintenance stand that is useful for disassembling and reassembling modules of a gas turbine engine in order to maintain the gas turbine engine for safety and performance purposes.

Description of the Related Art

Gas turbine engines are typically bulky machines weighing several thousand kilograms that need to be installed onto aircraft to power the aircraft and occasionally removed for maintenance and repair. Such engines generally comprise modules and maintenance and repair operations typically involve at least some measure of disassembling and reassembly those modules.

A variety of equipment is known for installing gas turbine engines onto aircraft and/or for supporting gas turbine engines during maintenance. For example, United States patent application US 2018/0311808 A1 discloses an engine assembly stand that comprises two parallel posts, a horizontal girder which connects the tops of the posts and is vertically movable, and a suspension frame which can be displaced along the movable girder in a lateral direction and is further suitable for turning the engine mounted thereon about the main axes. International patent application WO 2017/020882 A1 discloses an assembly system for assembling, disassembling and/or maintaining a gas turbine, the assembly system comprising a first guide carriage for holding a first engine component, in particular a turbine module of the gas turbine, a second guide carriage for holding a second engine component, in particular a compressor module of the gas turbine, and a connection module which can be detachably connected to the first and second guide carriages via corresponding coupling means. Such a system does not allow for external components to be readily stripped not least simultaneously from both sides of the engine. It therefore constricts the user to restrictive strip methods and inflexible maintenance schedules. The system of WO 2017/020882 A1 also requires the core support tooling to be shipped with the system and it provides no easy route to enable gas turbine stripping to a modular level.

Gas turbine engine maintenance stands and related ground support equipment need to be available where the maintenance needs to be conducted. This can be at or near airports anywhere in the world. Gas turbine engines stands are typically bulky and heavy so transporting them to their desired locations can be onerous. Transportation by sea or land, more typically a combination of both, are options but they are generally time consuming and require specialist equipment and facilities throughout the transportation, often at various locations along the journey. Transportation by air would be potentially less time consuming but known gas turbine stands are typically too bulky for such transportation. Cargo or freight aircraft is available for transporting large and heavy cargo by air but the cost of acquiring or hiring such aircraft is generally prohibitive, and the use of such large aircraft is simply not possible at many airports. Known gas turbine engine maintenance stands could be disassembled for more convenient transportation and reassembled at their desired destination but that would be time consuming and require intense efforts by specialist engineering staff before and after the journey to the desired destination.

A need remains for a gas turbine engine maintenance stand that overcomes one or more of the aforementioned problems or at least for a gas turbine engine maintenance stand that provides a useful alternative to known gas turbine engine maintenance stands.

SUMMARY OF THE DISCLOSURE

The present disclosure provides a gas turbine engine maintenance stand, and a method of disassembling a gas turbine engine, and a kit or parts, as set out in the appended claims.

According to a first aspect there is provided a gas turbine engine maintenance stand for a gas turbine engine that comprises detachable modules including an engine core module that houses a high pressure compressor and a turbine module that houses a low pressure turbine, the gas turbine engine maintenance stand comprising: a pair of base beams, each base beam having a first end, a midsection and a second end; an engine core module support that straddles the pair of base beams at their midsection, the engine core module support having engine core module support arms that are configured to engage opposing sides of the engine core module of the gas turbine engine; and a turbine module support that straddles the pair of base beams adjacent their second ends, the turbine module support having turbine module support arms that are configured to engage opposing sides of the turbine module of the gas turbine engine.

In some embodiments each engine core support arm is braced against one of the base beams by one or more structural support members.

In some embodiments the engine core module support has a mid-portion that connects the each engine core support arms and each engine core support arm is braced against the mid portion of the engine core module support by one or more structural support members.

In some embodiments each engine core support arm has an engine core module grip assembly that is configured to securably engage the engine core module of the gas turbine engine.

In some embodiments the turbine module support includes at least one hinge, e.g. that reduces torsion when connecting the turbine module support to the turbine module.

In some embodiments each turbine support arm has a turbine module grip assembly that is configured to securably engage the turbine module of the gas turbine engine.

In some embodiments the turbine module support is detachable from the stand.

In some embodiments each base beam has a plurality of wheel assemblies.

In some embodiments the gas turbine engine maintenance flat-packable.

In some embodiments the engine core module that is engaged by the engine core module support also houses or detachably includes one or more of a low pressure compressor and an intermediate pressure compressor.

In some embodiments the turbine module that is engaged by the turbine module support also houses or detachably includes an intermediate pressure turbine.

In some embodiments the engine core module that is engaged by the engine core module support or the turbine module that is engaged by the turbine module support also houses or detachably includes a high pressure turbine.

According to a second aspect there is provided a method of maintaining a gas turbine engine of an aircraft, the method comprising the steps of: positioning a gas turbine engine maintenance stand of the first aspect under the gas turbine engine to be maintained; moving the gas turbine engine from the aircraft onto the gas turbine engine maintenance stand; detachably engaging the engine core module support arms of the gas turbine engine maintenance stand to the engine core module of the gas turbine engine; detachably engaging the turbine module support arms of the gas turbine engine maintenance stand to the turbine module of the gas turbine engine; removing one or more modules of the gas turbine engine whilst supporting the engine core in the gas turbine engine maintenance stand; reassembling the gas turbine engine once maintenance is complete; detaching the engine core module support arms and the turbine module support arms from the gas turbine engine; and returning the gas turbine engine back onto the aircraft.

According to a third aspect there is provided a kit of parts comprising a pair of base beams, an engine core module support; and a turbine module support, the kit forming a gas turbine engine maintenance stand of the first aspect.

The kit of parts may be flat-packed in a storage container.

According to a fourth aspect there is provided a gas turbine engine maintained using the gas turbine engine maintenance stand of the first aspect or the method of the second aspect.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which:

FIG. 8A is a perspective view of the first embodiment of the gas turbine engine maintenance stand of the present disclosure supporting the gas turbine engine with low pressure compressor module having been removed from the gas turbine engine using a mobile lifting gantry.

FIG. 8B is a perspective view of a purpose-made transportation and storage pallet for the low pressure compressor module that has been removed from the gas turbine engine.

Figure 1:
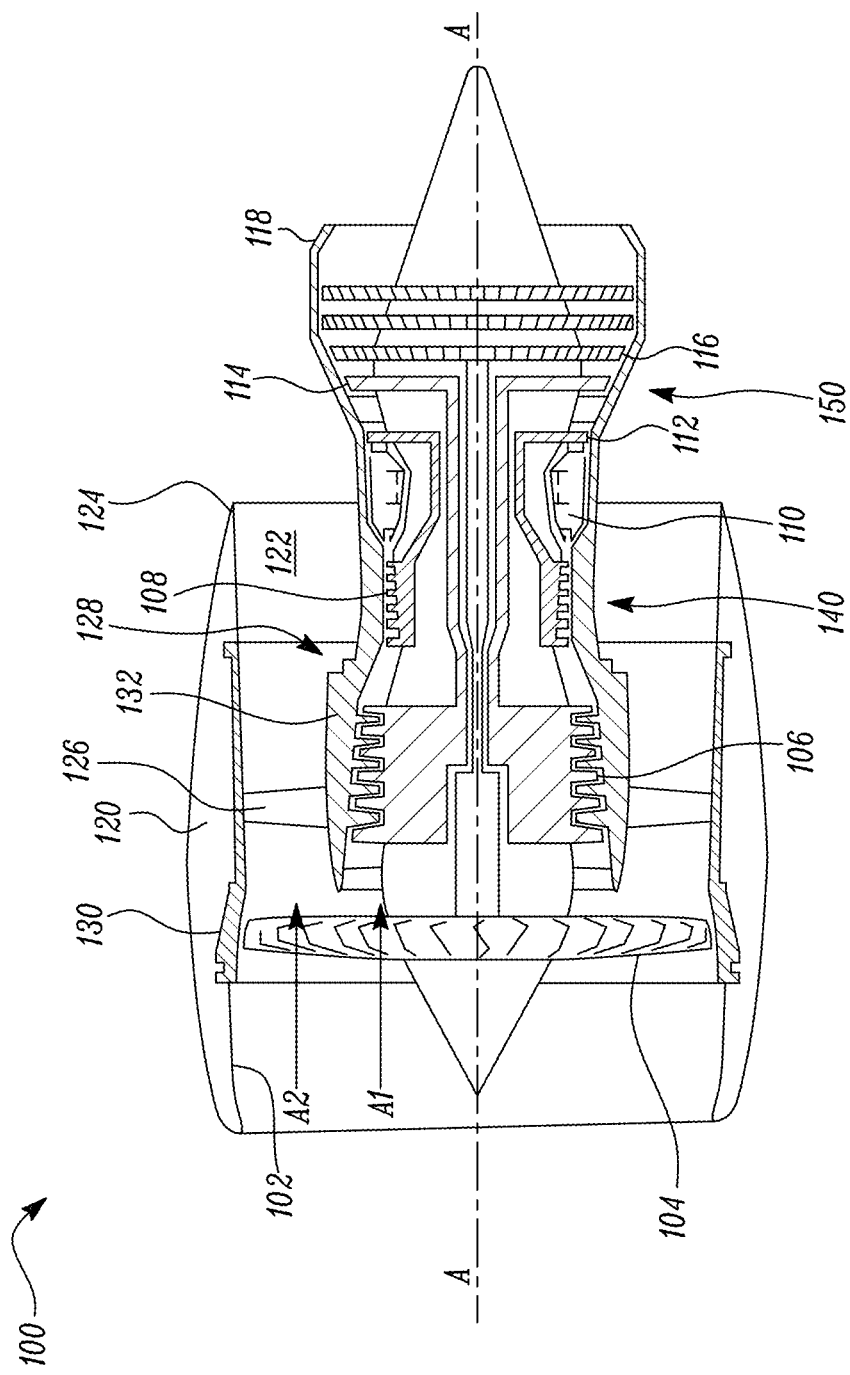
FIG. 1 is a sectional side view of a gas turbine engine that has a an engine core module and a turbine module.

The following table lists the reference numerals used in the drawings with the features to which they refer:

| No. | Feature |
|---|---|
| 100 | Gas turbine engine |
| 102 | Air intake |
| 104 | Propulsive fan |
| 105 | Low pressure compressor (LPC) |
| 106 | Intermediate pressure compressor (IPC) |
| 108 | High pressure compressor (HPC) |
| 110 | Combustion equipment |
| 112 | High pressure turbine (HPT) |
| 114 | Intermediate pressure turbine (IPT) |
| 116 | Low pressure turbine (LPT) |
| 118 | Engine core exhaust nozzle |
| 120 | Nacelle |
| 122 | Bypass duct |
| 124 | Bypass exhaust nozzle |
| 126 | Guide vanes |
| 128 | Engine core |
| 130 | Fan case |
| 132 | Engine casing |
| 140 | Engine core module |
| 150 | Turbine module |
| A-A | Axis |
| A1 | First air flow |
| A2 | Second air flow |
| 200 | Gas turbine engine maintenance stand |
| 205 | Base beam |
| 210 | First end (of base beam 205) |
| 215 | Mid-section (of base beam 205) |
| 220 | Second end (of base beam 205) |
| 225 | Engine core module support |
| 230 | Engine core module support arm |
| 233 | Engine core module support arm hinge |
| 235 | Engine core module grip assembly |
| 237 | Structural support member |
| 240 | Turbine module support |
| 245 | Turbine module support arm |
| 250 | Turbine module grip assembly |
| 252 | Hinge |
| 260 | Wheel assembly |
| 270 | Fan case dolly |
| 280 | Mobile lifting gantry |
| 285 | Transportation and storage pallet |
| 290 | Intermediate pressure compressor module stand |
| 292 | Tooling |
| 295 | Mobile lifting gantry crane |
| 297 | Parking stand |
| 300 | LPT transportation and storage trolley |
| 305 | IPT transportation and storage trolley |
| 308 | High pressure (HP) module |
| 310 | High pressure (HP) module transportation and storage trolley |
| 320 | Intercase module |

-continued

| No. | Feature |
|---|---|
| 325 | Intercase module support |
| 330 | Lifting frame |
| 340 | Lift adapter |
| 345 | Lifting interface |
| 350 | Stand support |

DETAILED DESCRIPTION OF THE DISCLOSURE

Aspects and embodiments of the present disclosure will now be discussed with reference to the accompanying figures. Further aspects and embodiments will be apparent to those skilled in the art.

With reference to FIG. 1, a gas turbine engine is generally indicated at 100, having a principal and rotational axis A-A. The gas turbine engine 100 comprises, in axial flow series, an air intake 102, a propulsive fan 104, an intermediate pressure compressor 106, a high pressure compressor 108, combustion equipment 110, a high pressure turbine 112, an intermediate pressure turbine 114, a low pressure turbine 116 and a engine core exhaust nozzle 118. A nacelle 120 generally surrounds the gas turbine engine 100 and defines the air intake 102, a bypass duct 122 and a bypass exhaust nozzle 124. A row of guide vanes 126 is positioned in the bypass duct 122 rearward of the propulsive fan 104.

During operation, air entering the air intake 102 is accelerated by the propulsive fan 104 to produce two air flows: a first air flow "A1" into the intermediate pressure compressor 106 and a second air flow "A2" which passes through the bypass duct 122 to provide propulsive thrust. The intermediate pressure compressor 106 compresses the air flow directed into it before delivering that air to the high pressure compressor 108 where further compression takes place.

The compressed air exhausted from the high pressure compressor 108 is directed into the combustion equipment 110 where it is mixed with fuel and the mixture combusted. The resultant hot combustion products then expand through, and thereby drive the high, intermediate and low pressure turbines 112, 114, 116 before being exhausted through the engine core exhaust nozzle 118 to provide additional propulsive thrust. The high, intermediate and low pressure turbines 112, 114, 116 drive respectively the high pressure compressor 108, the intermediate pressure compressor 106 and the propulsive fan 104, each by suitable interconnecting shaft and/or gear train.

The gas turbine engine 100 further includes an engine core 128 and a fan case 130. The engine core 128 typically includes or houses various components, such as the intermediate pressure compressor 106, the high pressure compressor 108, the combustion equipment 110, the high pressure turbine 112, the intermediate pressure turbine 114, the low pressure turbine 116 and the engine core exhaust nozzle 118. The engine core 128 further includes an engine casing 132 for at least partially enclosing certain components of the engine core 128. The fan case 130 is disposed around the engine core 128. The fan case 130 surrounds the propulsive fan 104 and the guide vanes 126. In some embodiments, the fan case 130 is coupled to the engine core 128 and/or the nacelle 120 by various methods, such as fasteners (e.g., bolts), welding, brazing, and so forth.

Gas turbine engines are typically formed from detachable modules that house certain components of the aforementioned components.

The gas turbine engine 100 illustrated in FIG. 1 is exemplary in nature. Other gas turbine engines to which the present disclosure may be applied may have alternative configurations. By way of example, such engines may have an alternative number of interconnecting shafts (e.g. two) and/or an alternative number of compressors and/or turbines. Further the engine may comprise a gearbox provided in a drive train from a turbine to a compressor and/or fan. The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above. The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

The gas turbine engine 100 is typically assembled in sections and these sections are then assembled to form the gas turbine engine 100. For example, the engine core 128 and the fan case 130 are assembled separately and then connected to each other. The fan case 130 is generally coaxially disposed around the engine core 128. Specifically, the engine core 128 and the fan case 130 may be coaxially disposed about the axis A-A. Correct alignment between the engine core 128 and the fan case 130 may be required before the engine core 128 and the fan case 130 are moved proximal to each other and connected.

Figure 2:
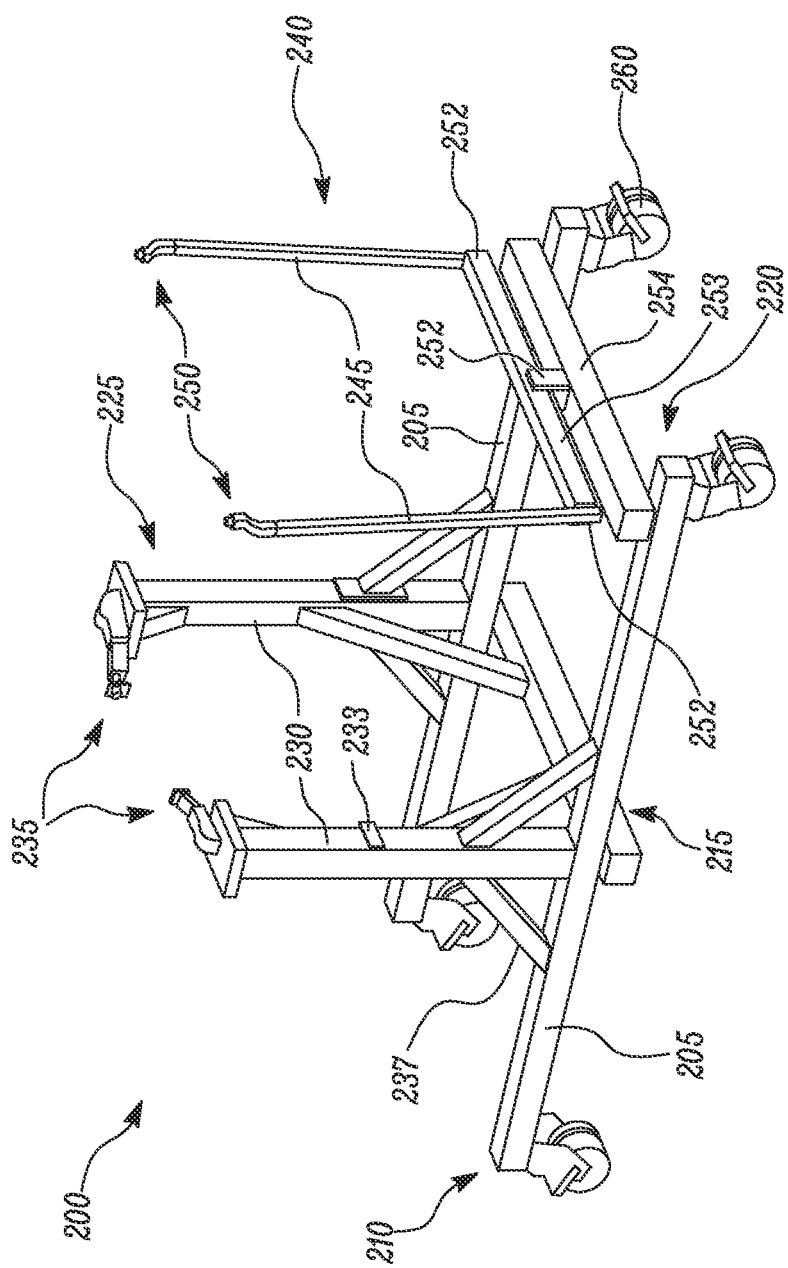
FIG. 2 is a perspective view of a first embodiment of a gas turbine engine maintenance stand of the present disclosure in its erected configuration.

FIG. 2 is a perspective view of a first embodiment of a gas turbine engine maintenance stand 200 of the present disclosure in its erected configuration. The gas turbine engine maintenance stand is suitable for use in maintaining a gas turbine engine that comprises detachable modules including an engine core module 140 and a turbine module 150. The composition of the engine core module 140 and the turbine module 150 can depend on the gas turbine engine concerned, however for present purposes the engine core module 140 houses a high pressure compressor and the turbine module 150 houses a low pressure turbine. The combustion equipment may be housed within the engine core module or within the turbine module or it may be separately detachable to the engine core module and/or the turbine module. Typically the gas turbine engine may include other modules such as an intake module and a fan case module.

The gas turbine engine maintenance stand 200 has a pair of base beams 205. Each of these base beams has a first end 210, a midsection 215 and a second end 220. In the embodiment shown the base beams are substantially parallel however in other embodiments the base beams are non-parallel. For example, in some embodiments the base beams may diverge with respect to a central axis e.g. with the distance between the first ends being greater than the distance between the second ends to accommodate the dimensions of the gas turbine engine to be maintained. In some embodiments the stand may be configured so that the orientation of the base beams can be adjusted to accommodate the dimensions of a variety of gas turbine engines. In some embodiments one or more additional base beams may be provided to enhance the robustness of the stand.

The gas turbine engine maintenance stand 200 has an engine core module support 225 that straddles the pair of base beams 205 at their midsection 215, although not necessarily at their midpoint. The engine core module support 225 is connected to the base beams 205 by any suitable manner for the purpose, for example detachable clamps. The engine core module support 225 can take a variety of forms to fulfil the purpose of supporting the core module of the gas turbine engine to be maintained during the desired maintenance, disassembly and reassembly procedures. In the embodiment shown the engine core module support 225 has engine core module support arms 230, e.g. a pair of engine core module support arms 230, which are configured to engage opposing sides of the engine core module 140 of the gas turbine engine. Each engine core module support arm 230 may be provided with an engine core module grip assembly 235 that is formed to securably engage with the engine core module 140. The engine core module grip assembly may be provided in a variety of suitable forms, which may be specific to the type of gas turbine engine being maintained. The engine core module grip assembly may, for example comprise a trunnion and a trunnion and a trunnion support. In the embodiment shown, structural support members 237 are provided to support the engine core module support arms 230 with respect to the engine core module support 225 and/or the base beams 205.

The gas turbine engine maintenance stand 200 has a turbine module support 240 that straddles the pair of base beams 205 adjacent their second ends 220. The turbine module support 240 can take a variety of forms to fulfil the purpose of supporting the turbine module 150 of the gas turbine engine to be maintained during the desired maintenance, disassembly and reassembly procedures. It may be detachable from the stand, for example when it is not required during the process of disassembling or reassembling a gas turbine engine or indeed when its presence may hinder the removal of certain modules from the engine. The turbine module support 240 has turbine module support arms 245, e.g. a pair of turbine module support arms 245, which are configured to engage opposing sides of the turbine module 150 of the gas turbine engine. Each turbine module support arm 245 may be provided with a turbine module grip assembly 250 that is formed to securably engage with the turbine module.

The turbine module houses a low pressure turbine but it may also house an intermediate pressure turbine and/or a high pressure turbine depending on the construction of the gas turbine engine concerned. In the gas turbine engine shown, the turbine module houses a low pressure turbine and an intermediate pressure turbine.

The turbine module grip assembly 250 may be provided in a variety of suitable forms, which may be specific to the type of gas turbine engine being maintained. The turbine module grip assembly may, for example comprise a trunnion and a trunnion and a trunnion support. The turbine module support 240 may include hinges 252 to reduce torsion when connecting the turbine module support 240 to the turbine module of the engine. In the embodiment shown the turbine module support 240 includes a balance beam 253 with a turbine module support arm 245 pivotably connected at each end. The balance beam 253 is connected to a cross beam 254 by the hinge 252, which spans between the base beams 205 at the second end 220 of each of the base beams 205.

In certain embodiments such as that shown, the gas turbine engine maintenance stand 200 may be provided with a set of wheel assemblies 260 for transporting the stand 200 to the gas turbine engine 100 for maintenance. The wheel assemblies 260 may be provided in a variety of suitable forms and at a variety of suitable locations on the stand 200. In the embodiment shown wheel assemblies 260 is provided at the first end 210 and the second end 220 of each of the base beams 205. The wheel assemblies 260 may be lockable so the stand can be kept in place as and when needed for that. In other embodiments the gas turbine engine maintenance stand 200 may be mounted on a suitable trolley or other means for transporting the stand 200 to the engine.

In the erected configuration of the stand 200 shown in FIG. 2, the gas turbine engine 100 to be maintained can be secured, e.g. bootstrapped, directly from the aircraft into the stand 200. No units are required to be removed to facilitate the use of the stand.

In use the stand 200 is manoeuvred into position underwing the gas turbine engine 100 to be maintained and the engine is then lowered into and onto the stand using suitable equipment for that purpose. This procedure can be completed with the air intake module still fitted.

Figures 3A, 3B:
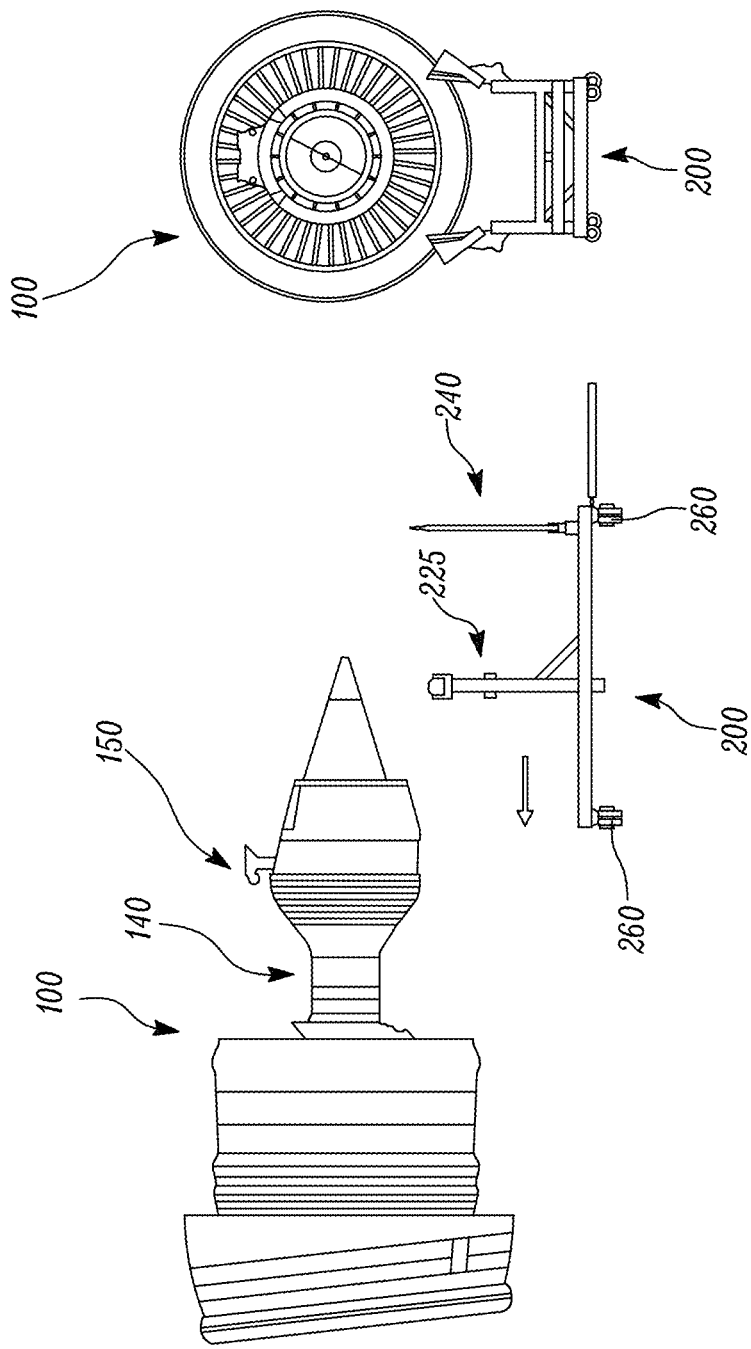
FIG. 3A is a side view that depicts how the gas turbine engine maintenance stand of the first embodiment in its erected configuration is moved into position from behind a gas turbine engine that is due for maintenance.
FIG. 3B is an end view of the gas turbine engine with the first embodiment of the gas turbine engine maintenance stand of the present disclosure located into position under it in preparation for maintaining the gas turbine engine.

FIG. 3A is a side view that depicts how the gas turbine engine maintenance stand of the first embodiment in its erected configuration is moved into position from behind a gas turbine engine that is due for maintenance. The engine and the stand are then ready for certain modules of the engine to be disassembled. In the gas turbine engine 100 shown, the engine core module 140 houses or detachably includes a low pressure compressor, an intermediate pressure compressor, a high pressure compressor, and a high pressure turbine. In the gas turbine engine 100 shown, the turbine module 150 houses or detachably includes an intermediate pressure turbine and a low pressure turbine.

FIG. 3B is an end view of the gas turbine engine with the first embodiment of the gas turbine engine maintenance stand of the present disclosure located into position under it and supporting it in preparation for maintaining the gas turbine engine.

Figure 4:
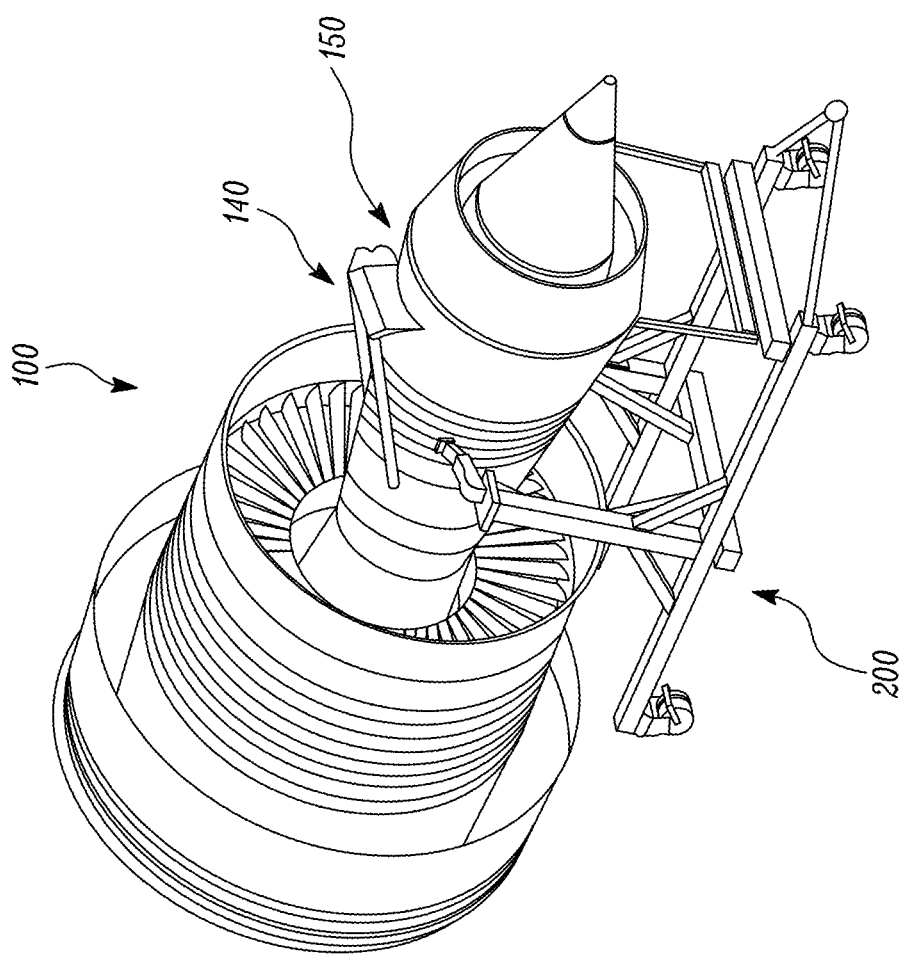
FIG. 4 is a perspective view of the gas turbine engine maintenance stand of the present disclosure that is supporting the gas turbine engine that is due for maintenance.

FIG. 4 is a perspective view of the gas turbine engine maintenance stand 200 of the present disclosure supporting the gas turbine engine that is due for maintenance. Sequence of operations from this point varies depending on what work scope is required for the gas turbine. For present descriptive purposes the fan case 130 is the first part removed. It is not necessary to remove the intake module however several of the figures that follow show the intake has been removed.

Before continuing to describe how the gas turbine engine maintenance stand 200 of the present disclosure is used to disassemble a gas turbine engine at a modular level for conduct maintenance activities, it should be noted that a useful feature of the stand is that it can be stored and transported in a collapsed or disassembled configuration or condition. Indeed the stand may be flat-packed for convenient, space-efficient and cost-efficient storage and transportation.

Figure 5:
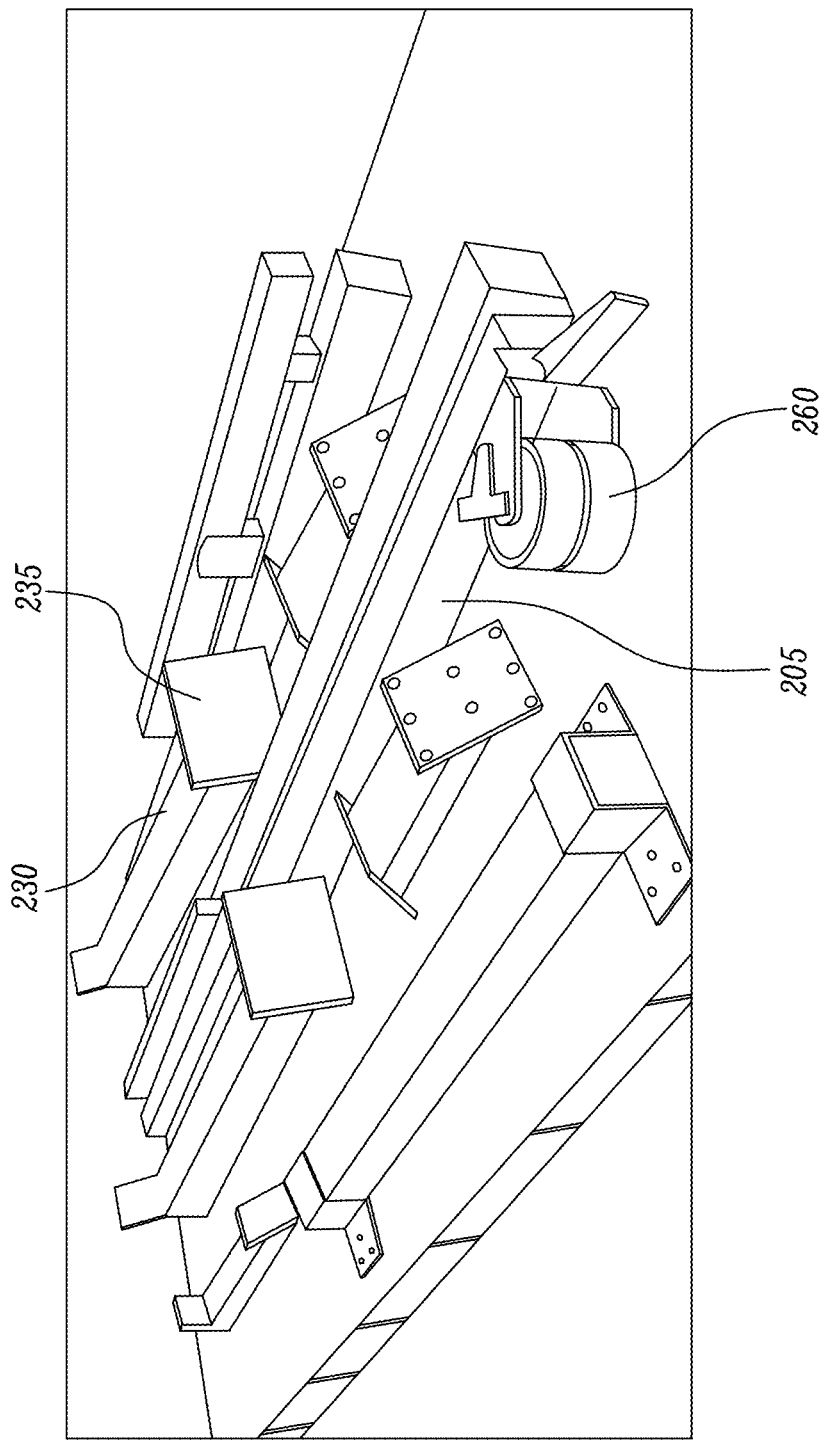
FIG. 5 is a perspective view of the first embodiment of the gas turbine engine maintenance stand of the present disclosure in its disassembled and flat-packable configuration for space-efficient storage and convenient transportation.

FIG. 5 is a perspective view of the first embodiment of the gas turbine engine maintenance stand of the present disclosure in its disassembled and flat-packable configuration. Cargo freight shipping on main deck is often expensive and reliance on shipping will have significant impact delivery commitments especially with respect to route frequency and destination. The gas turbine engine maintenance stand 200 of the present disclosure being readily disassembleable, more particularly, flat packable enables the stand to be readily transportable by rail, road or even by air. A flat-packed turbine engine maintenance stand 200 of the present disclosure may for example be stored within the lower hold of a passenger carrying aircraft. Once the stand has been delivered to the required location it can be built up with minimal infrastructure e.g. two spanners and two sockets.

Returning now to how the gas turbine engine maintenance stand 200 of the present disclosure can be used to disassemble a gas turbine engine module by module to conduct maintenance, more particularly, as an example, beginning with removing the fan case from the engine. A fan case dolly is connected to the fan case to support the fan case for removal. Fan case dollies are commercially available or can be constructed for the purpose using known methods.

Figure 6:
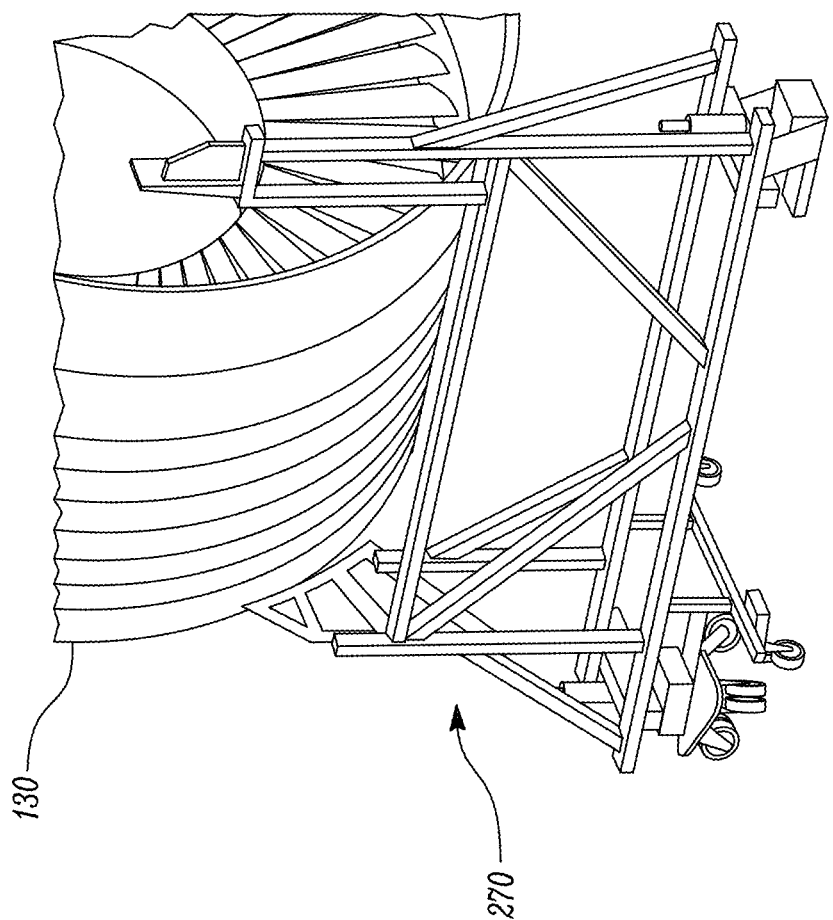
FIG. 6 is a perspective view of the fan case of the gas turbine engine shown in FIG. 4 with a fan case dolly located in a fan case-supporting position adjacent the fan case in preparation for removing the fan case module from the gas turbine engine.

FIG. 6 is a perspective view of the fan case 130 of the gas turbine engine 100 shown in FIG. 4 with a fan case dolly 270 located in a fan case-supporting position adjacent the fan case in preparation for removing the fan case module from the gas turbine engine. While FIG. 6 does not show an intake module, the intake module does not need to be removed from the fan case 130 in order to remove the fan case from the gas turbine engine. The fan case dolly 270 may be provided with height-adjustable jacks.

The low pressure compressor blades may be removed along with all bifurcation panel connections and any other connections that would prevent separation of the fan case 130 from the engine core. The stand 200 is designed and fan case dolly is selected or designed in such a way that access to required points is substantially unhindered thus allowing standard access platforms to be used to access areas at height.

Figure 7B:
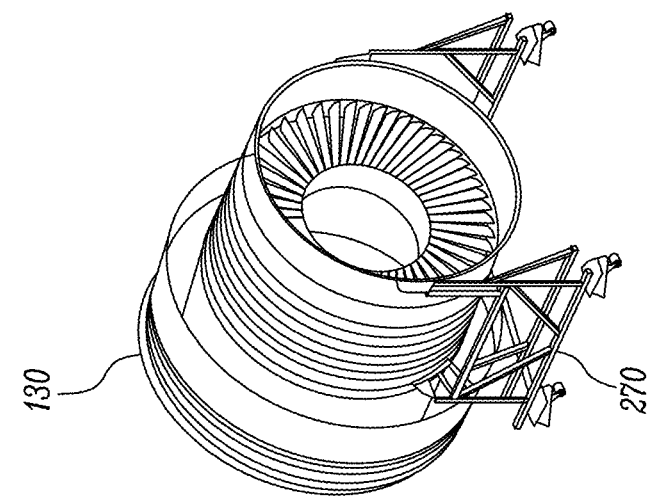
FIG. 7B is a perspective view of the fan case module that has been removed from the gas turbine engine, the fan case module being supported on the fan case dolly.
Figure 7A:
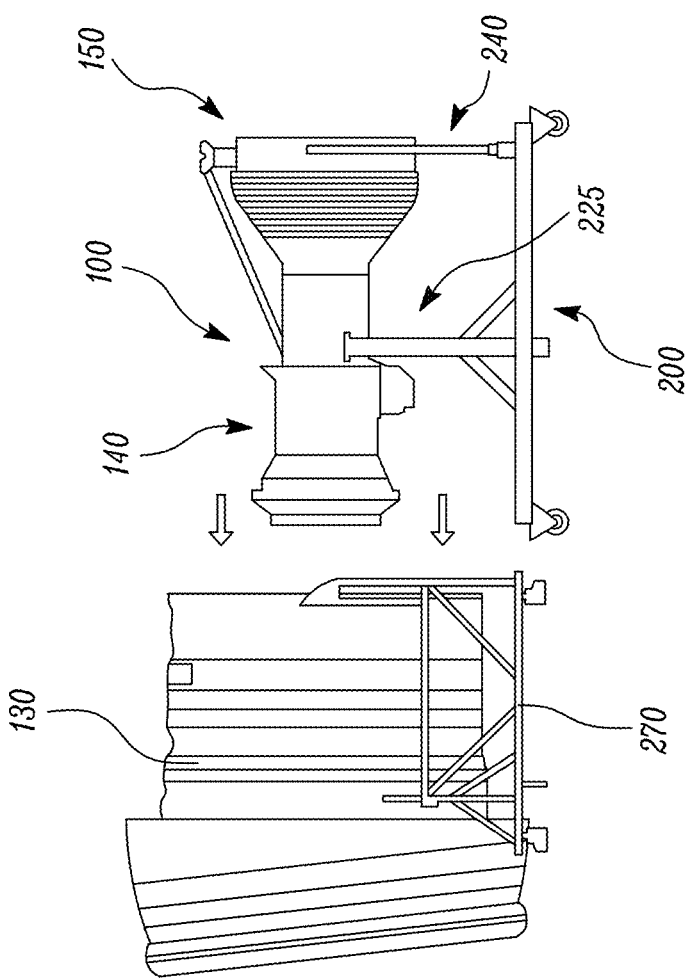
FIG. 7A is a side view of the first embodiment of the gas turbine engine maintenance stand of the present disclosure that is supporting the gas turbine engine as the fan case module that is supported on the fan case dolly is removed from the gas turbine engine by wheeling the fan case dolly shown in FIG. 6 in an axial direction away from the gas turbine engine maintenance stand.

FIG. 7A is a side view of the first embodiment of the gas turbine engine maintenance stand 200 of the present disclosure that is supporting the gas turbine engine as the fan case module that is supported on the fan case dolly 270 is removed from the gas turbine engine by wheeling the fan case dolly shown in FIG. 6 in an axial direction away from the gas turbine engine maintenance stand. The maintenance stand continues to support the engine core module 140 of the gas turbine engine and the turbine module 150 of the gas turbine engine.

FIG. 7B is a perspective view of the fan case module that has been removed from the gas turbine engine, the fan case module being supported on the fan case dolly 270. In FIGS. 7A and 7B the intake module is still attached to the fan case 130.

In the next step of an illustrative disassembly the low pressure compressor 105 module of the gas turbine engine 100 is separated from the engine core 128 using a mobile lifting gantry 280 and transported for storage in a suitable location until required for reassembly. Mobile lifting gantries are commercially available or can be constructed for the purpose using known methods.

FIG. 8A is a perspective view of the first embodiment of the gas turbine engine maintenance stand of the present disclosure supporting the gas turbine engine with low pressure compressor 105 module having been removed from the gas turbine engine using the mobile lifting gantry 280.

FIG. 8B is a perspective view of a purpose-made transportation and storage pallet 285 for the low pressure compressor 105 module that has been removed from the gas turbine engine.

With the use of the mobile lifting gantry 280 strip tooling can be fitted to the intermediate pressure compressor disk and shaft assembly of the intermediate pressure compressor 106. Shaft connection points can be removed and the mobile lifting gantry can be pushed back under load. The removed intermediate pressure compressor module can be suitably stored, for example on a purpose made intermediate compressor module stand 290.

Figure 9B:
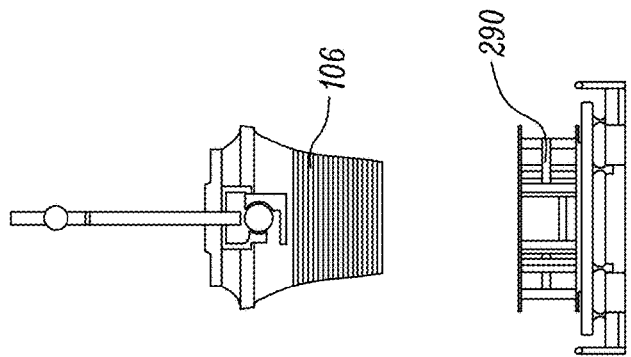
FIG. 9B is a side view of the intermediate pressure compressor module suspended from the mobile lifting gantry in preparation for being lowered on a purpose-made transportation and storage pallet for the intermediate pressure compressor module.
Figure 9A:
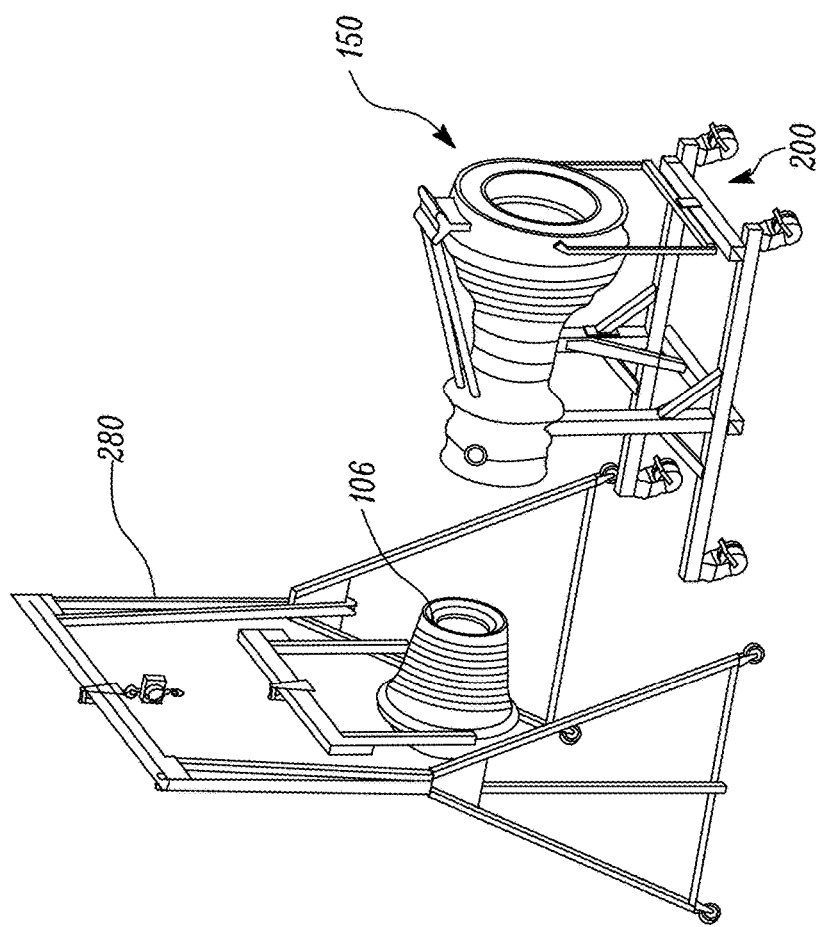
FIG. 9A is a perspective view of the first embodiment of the gas turbine engine maintenance stand of the present disclosure supporting the gas turbine engine with an intermediate pressure compressor module having been removed from the gas turbine engine using the mobile lifting gantry.

FIG. 9A is a perspective view of the first embodiment of the gas turbine engine maintenance stand of the present disclosure supporting the gas turbine engine with an intermediate pressure compressor 106 module having been removed from the gas turbine engine using the mobile lifting gantry 280.

FIG. 9B is a side view of the intermediate pressure compressor 106 module suspended from the mobile lifting gantry 280 in preparation for being lowered on a purpose made intermediate compressor module stand 290.

The operation now moves to rear end stripping.

Figure 10:
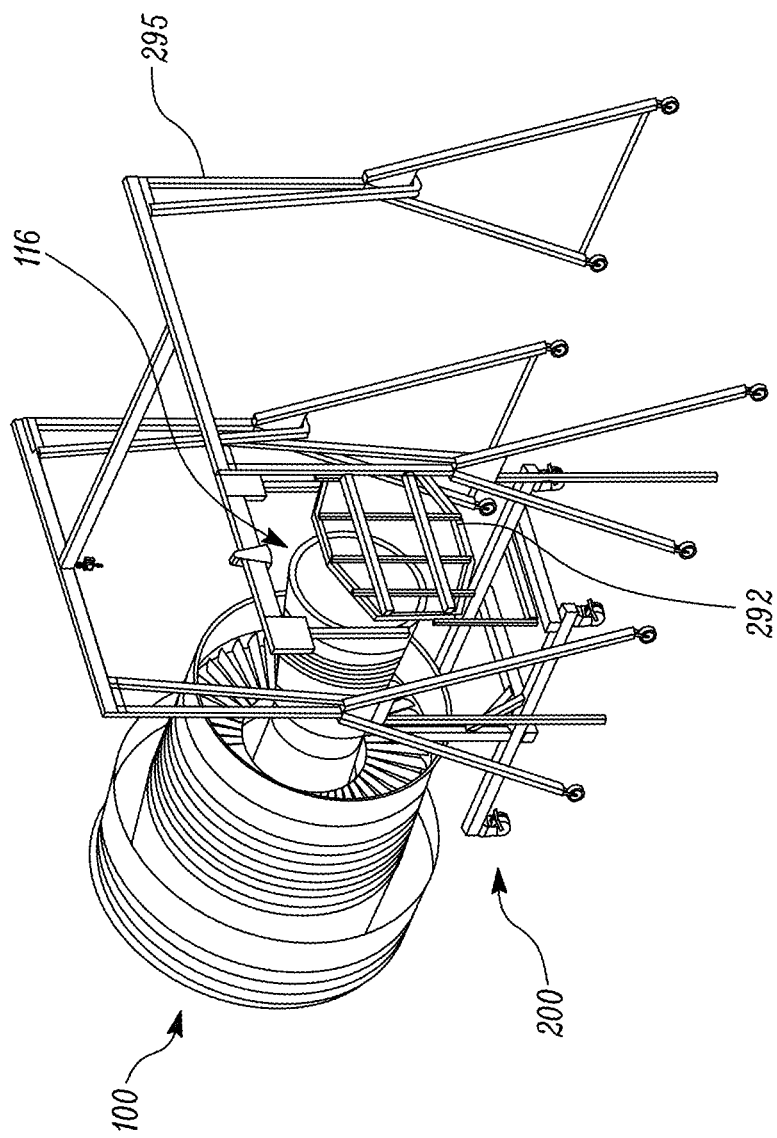
FIG. 10 is a perspective view of the first embodiment of the gas turbine engine maintenance stand of the present disclosure that is supporting the fully assembled gas turbine engine (less the engine nacelle) with a gantry crane located adjacent and fitted to the low pressure turbine module of the gas turbine engine in preparation for removing the low pressure turbine module from the gas turbine engine.

FIG. 10 is a perspective view of the first embodiment of the gas turbine engine maintenance stand 200 of the present disclosure that is supporting a fully assembled gas turbine engine with a mobile lifting gantry crane 295 located adjacent and fitted to the low pressure turbine 116 module of the gas turbine engine in preparation for removing the low pressure turbine module from the gas turbine engine. Mobile lifting gantry cranes are commercially available or can be constructed for the purpose using known methods. Whether the engine is stripped from the front of the back is determined by the nature of the maintenance that is required. When stripping from the back as per FIG. 10, tooling 292 may be used to provide an interface for handling and protection purposes.

In the next step of an illustrative disassembly the mobile lifting gantry crane 295 is moved into position over the gas turbine engine 100 and weight optimised tooling is fitted to the low pressure turbine 116 module. The low pressure turbine module and is removed using the traverse function of the mobile lifting gantry crane 295 and hydraulic pushing tools (not shown). Once removed the low pressure turbine module 116 may be initially loaded onto a parking stand 297 and may later be transferred to a purpose-made LPT transportation and storage trolley 300 (or a suitable stand) for the low pressure turbine module.

Figure 11B:
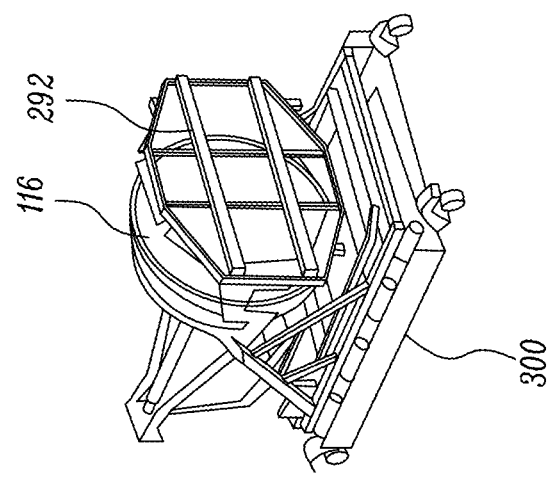
FIG. 11B is a perspective view of the low pressure turbine module of the gas turbine engine located on a purpose-made transportation and storage trolley or stand for the low pressure turbine module.
Figure 11A:
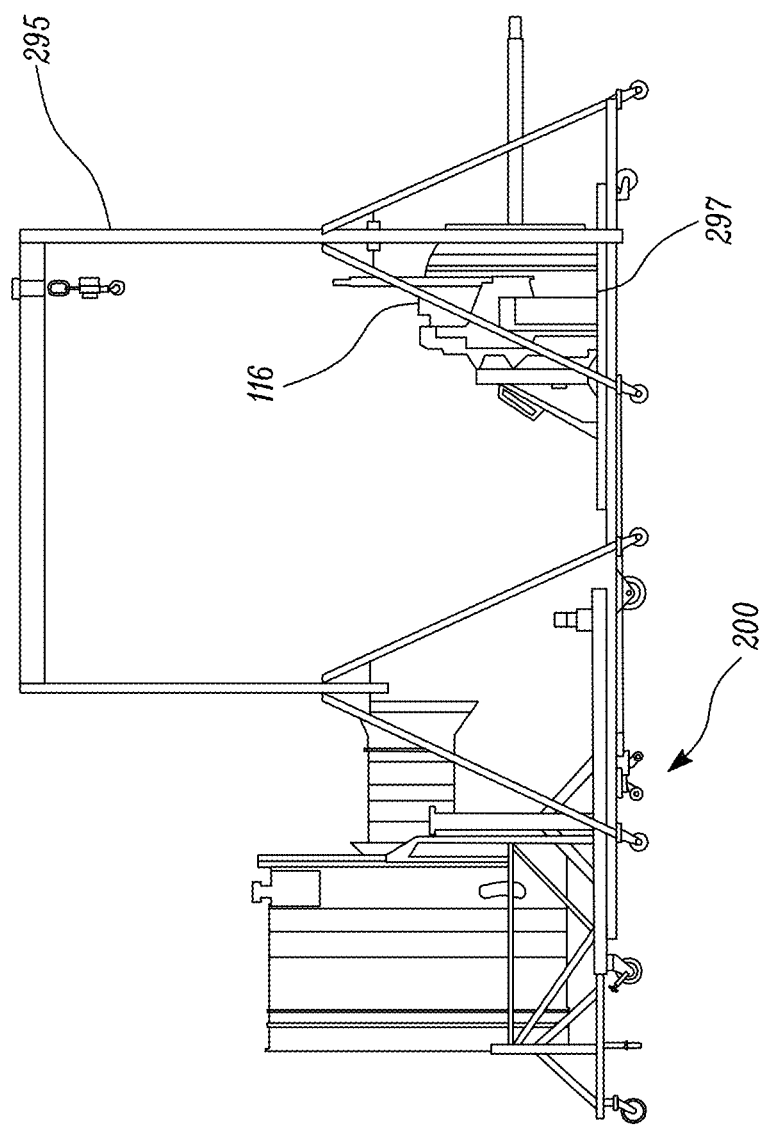
FIG. 11A is a side view of the first embodiment of the gas turbine engine maintenance stand of the present disclosure where the low pressure turbine module of the gas turbine engine has been separated from the gas turbine engine using the gantry crane shown in FIG. 10.

FIG. 11A is a side view of the first embodiment of the gas turbine engine maintenance stand 200 of the present disclosure where the low pressure turbine 116 module of the gas turbine engine has been separated from the gas turbine engine using the mobile lifting gantry crane 295 shown in FIG. 10.

FIG. 11B is a perspective view of the low pressure turbine 116 module of the gas turbine engine located on the transportation and storage trolley 300 for the low pressure turbine module.

Now the mobile lifting gantry crane 295 can be moved into position over the engine 100 and weight optimised tooling can be fitted to the intermediate pressure turbine 114. The intermediate pressure turbine may be removed using a traverse function of the mobile lifting gantry crane 295 and the hydraulic pushing tools (not shown). Once removed, the intermediate pressure turbine may be initially loaded onto a parking stand 297 and may later be transferred to a purpose-made IPT transportation and storage trolley 305 (or a suitable stand) for the intermediate pressure turbine module.

Figures 12A, 12B:
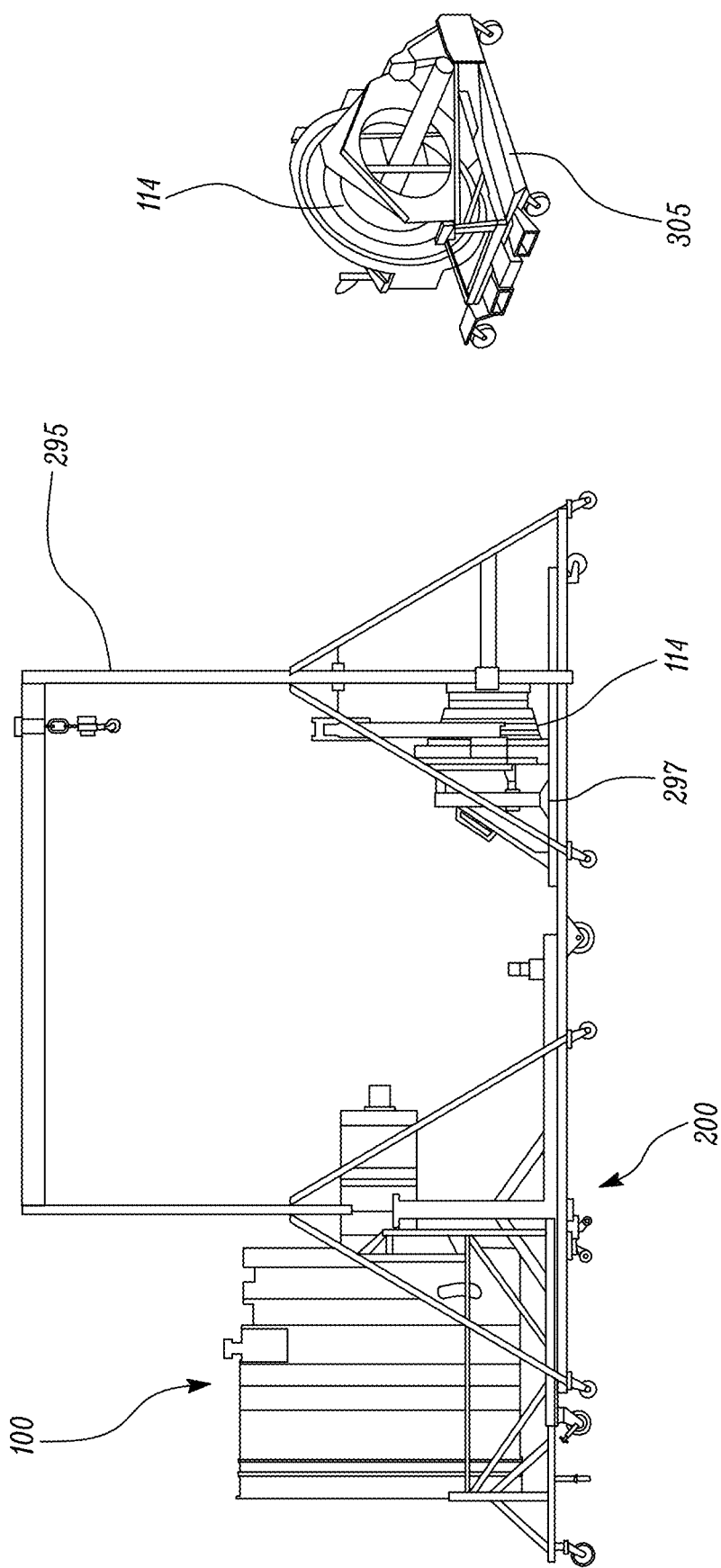
FIG. 12A is a side view of the first embodiment of the gas turbine engine maintenance stand of the present disclosure where the intermediate pressure turbine module of the gas turbine engine has been separated from the gas turbine engine using the gantry crane shown in FIG. 10.
FIG. 12B is a perspective view of the intermediate pressure turbine module of the gas turbine engine located on a purpose-made transportation and storage trolley or stand for the intermediate pressure turbine module.

FIG. 12A is a side view of the first embodiment of the gas turbine engine maintenance stand of the present disclosure where the intermediate pressure turbine 114 module of the gas turbine engine has been separated from the gas turbine engine using the gantry crane 295 shown in FIG. 10.

FIG. 12B is a perspective view of the intermediate pressure turbine 114 module of the gas turbine engine located on a purpose-made transportation and storage trolley or stand for the intermediate pressure turbine module.

With the mobile lifting gantry crane 295 moved into position over the engine 100, weight optimised tooling is fitted to the high pressure module 308 comprising the high pressure turbine 112 and the high pressure compressor 108 and is removed using the traverse function of the mobile lifting gantry crane 295 and hydraulic pushing tools (not shown). Once removed the high pressure module may initially be loaded onto a purpose-made high pressure (HP) module transportation and storage trolley 310 for the high pressure turbine module and may later be transferred to a parking stand 297.

Figures 13A, 13B:
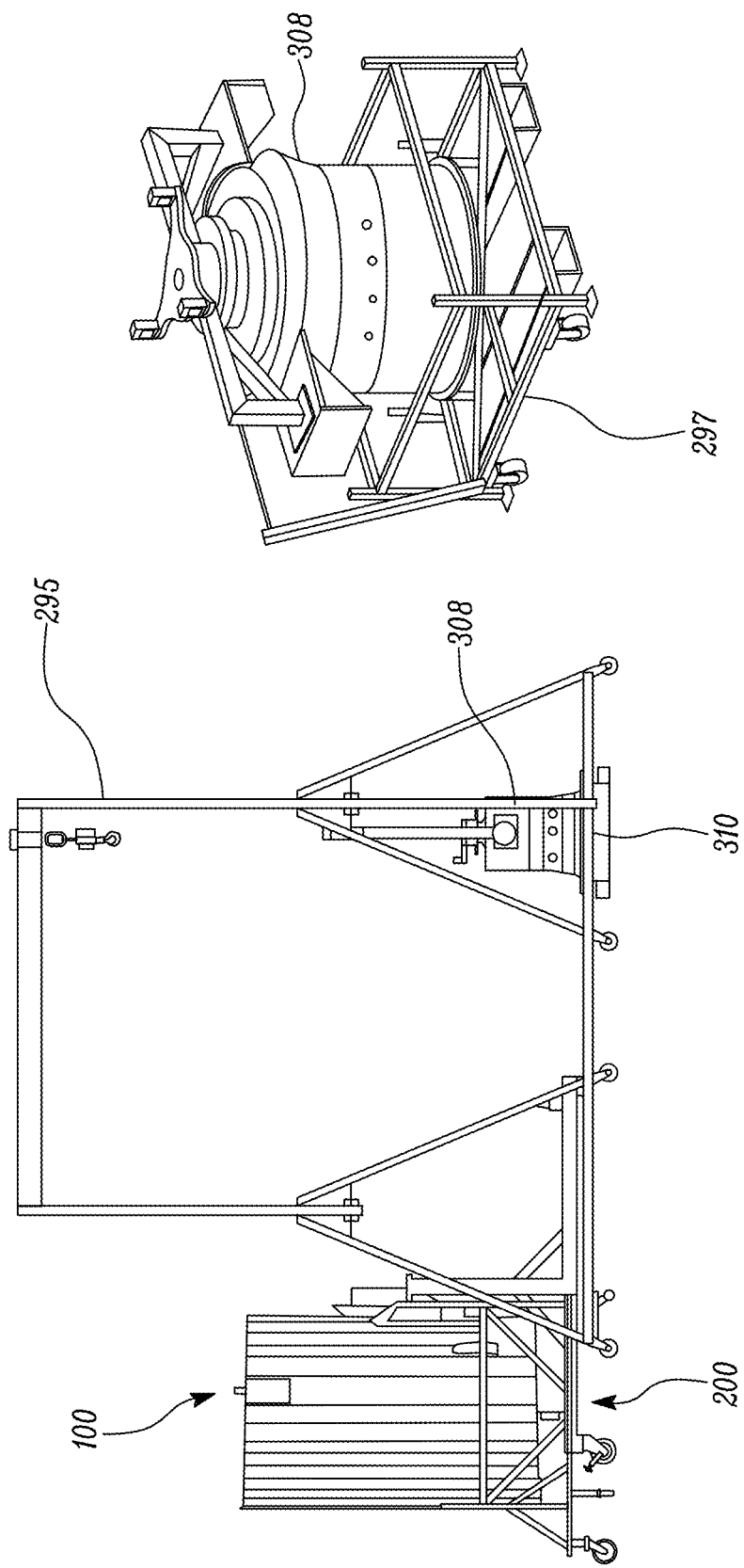
FIG. 13A is a side view of the first embodiment of the gas turbine engine maintenance stand of the present disclosure where the high pressure turbine module of the gas turbine engine has been separated from the gas turbine engine using the gantry crane shown in FIG. 10.
FIG. 13B is a perspective view of the high pressure turbine module of the gas turbine engine located on a purpose-made transportation and storage trolley or stand for the high pressure turbine module.

FIG. 13A is a side view of the first embodiment of the gas turbine engine maintenance stand 200 of the present disclosure where the high pressure turbine module 112 of the gas turbine engine has been separated from the gas turbine engine using the mobile lifting gantry crane 295 first shown in FIG. 10.

FIG. 13B is a perspective view of the high pressure turbine module of the gas turbine engine located on the high pressure (HP) module transportation and storage trolley 310.

Figure 14:
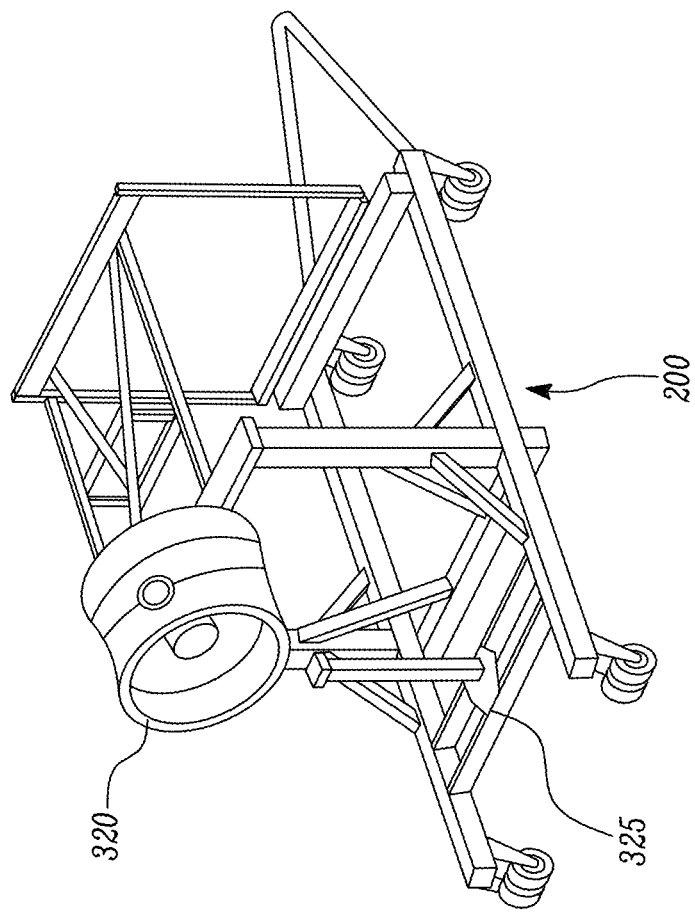
FIG. 14 is a perspective view of the first embodiment of the gas turbine engine maintenance stand of the present disclosure only supporting an intercase module of the gas turbine engine.

In a next step of an illustrative disassembly an intercase module 320 is then left in the gas turbine engine maintenance stand 200 of the present disclosure and suitable storage or lifting tooling is used to move the intercase module. The intercase module 320 can be stored on the stand 200 if not included in the work scope or taken off and stored. This is shown in FIG. 14, which is a perspective view of the first embodiment of the gas turbine engine maintenance stand of the present disclosure only supporting an intercase module of the gas turbine engine. An intercase module support 325 may be provided on the stand 200, e.g. on the base beams 205, to assist in supporting the intercase module.

While the gas turbine engine maintenance stand 200 of the present disclosure may include wheel assemblies 260 to transport the stand a lifting frame 330 may be provided to assist in moving the stand, for example using a forklift.

Figure 15:
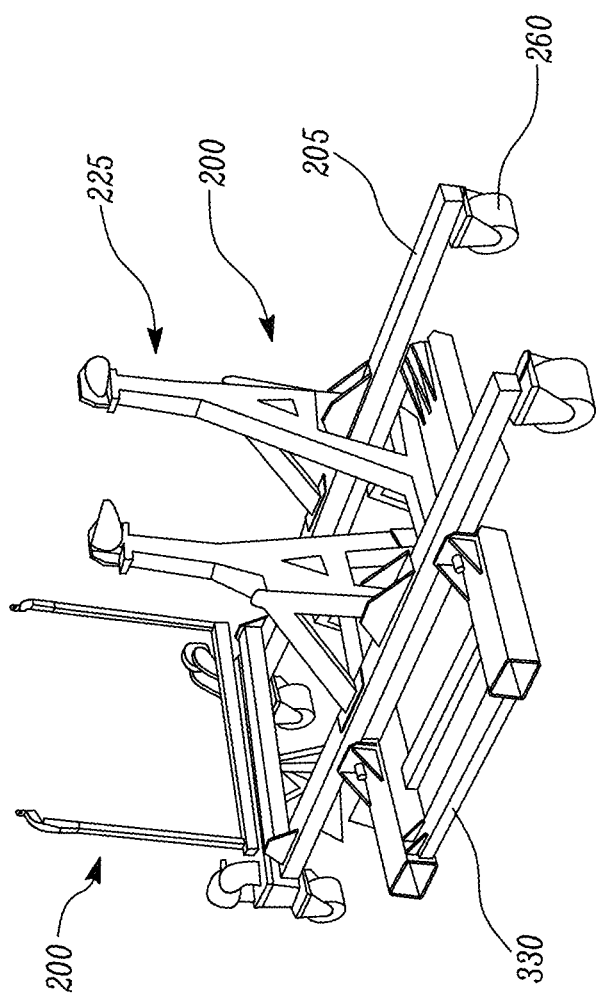
FIG. 15 is a perspective view of the first embodiment of the gas turbine engine maintenance stand of the present disclosure with a lifting frame provided to assist in moving the stand, for example using a forklift.

FIG. 15 shows a perspective view of the first embodiment of the gas turbine engine maintenance stand of the present disclosure with such a lifting frame provided.

The gas turbine engine maintenance stand 200 of the present disclosure may be adapted to be lifted by a crane. A lift adapter 340 may be used for such a purpose. Such a lift adapter may be detachably secured to the base beams 205 of the stand, e.g. adjacent the first ends 210 thereof. This may be used in combination with lifting interfaces suitably located on each of the engine core support arms 230.

Figure 16B:
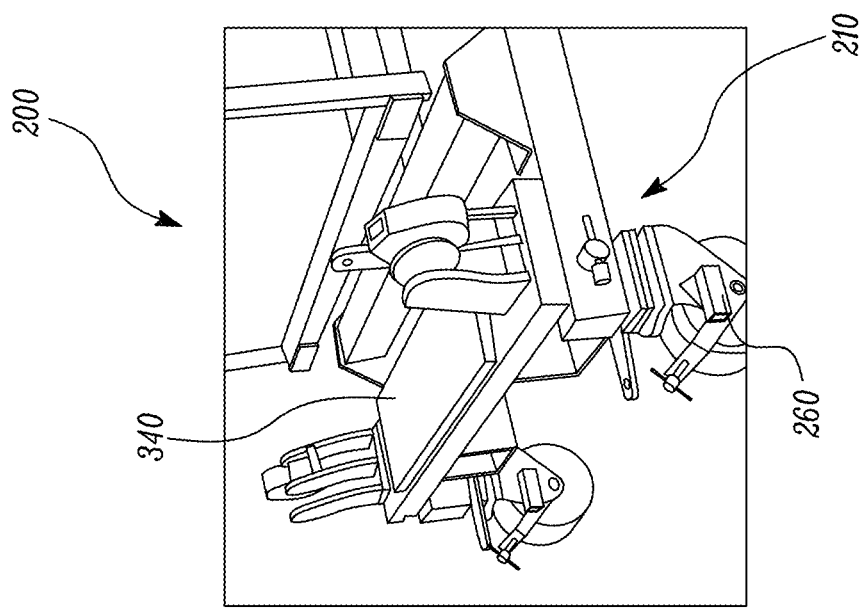
FIG. 16B is a partial perspective view of the first embodiment of the gas turbine engine maintenance stand of the present disclosure with a lift adapter installed onto the gas turbine engine maintenance stand in preparation for lifting the gas turbine engine maintenance stand, e.g. using a crane.
Figure 16A:
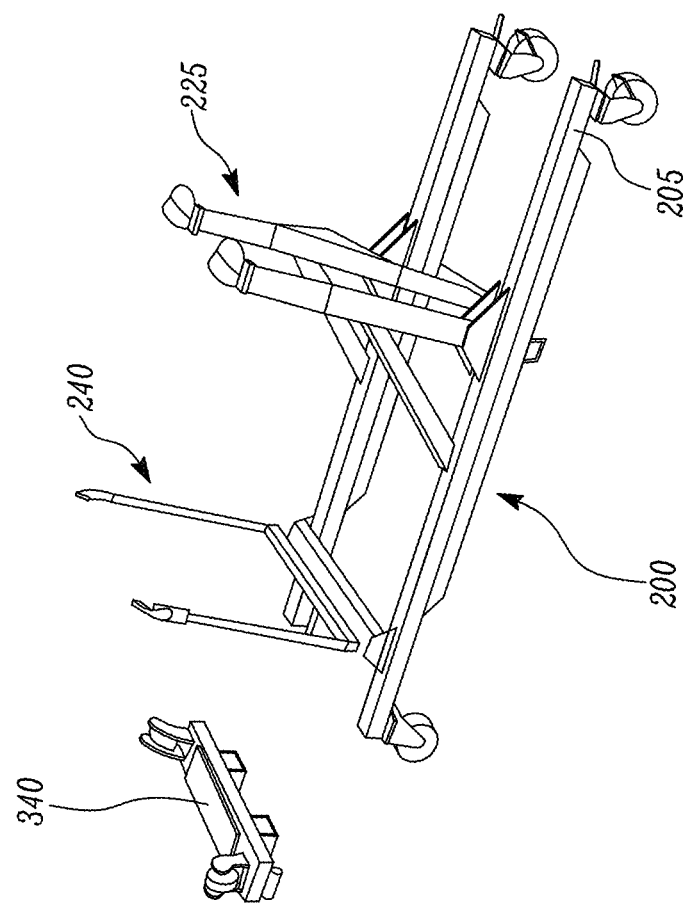
FIG. 16A is a perspective view of the first embodiment of the gas turbine engine maintenance stand of the present disclosure and a lift adapter that has yet to be installed onto the gas turbine engine maintenance stand.

FIG. 16A show a perspective view of the first embodiment of the gas turbine engine maintenance stand of the present disclosure and such a lift adapter that has yet to be installed onto the gas turbine engine maintenance stand.

FIG. 16B shows the same stand with a lift adapter installed.

When wishing to transport the stand 200 on a plurality of stand supports 350 may usefully be provided upon which the stand 200 can be lifted. The stand supports 350 keep the wheel assembles 260 off the ground.

Figure 17:
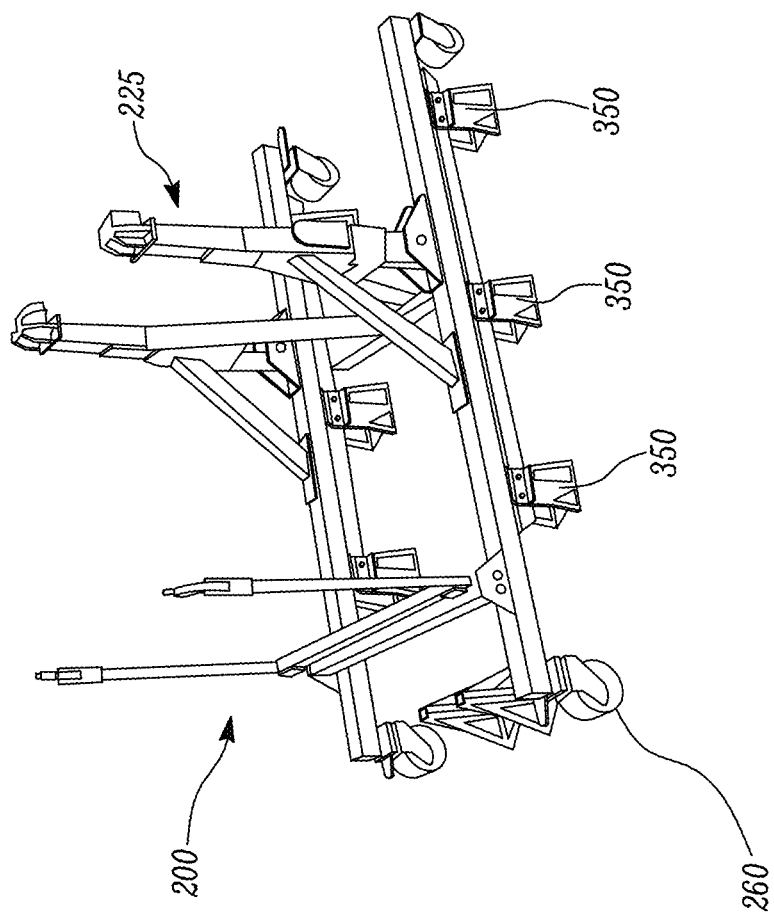
FIG. 17 is a perspective view of the first embodiment of the gas turbine engine maintenance stand of the present disclosure raised on a plurality of stand supports.

FIG. 17 is a perspective view of the first embodiment of the gas turbine engine maintenance stand of the present disclosure raised on a plurality of stand supports. Such stand supports 350 may be fixed on a pallet for transportation purposes.

The stand and its parts may be made of any material suitable for their purpose and function. The stand or at least some of its parts may be provided with a protective coating, for example a coating that provides corrosion resistance. The stand or at least some of its parts may be galvanised.

While the above steps have been provided to show how various modules of a gas turbine engine can be removed using the gas turbine engine maintenance stand 200 of the present disclosure, the present disclosure may be said to more simply to provide a method of maintaining a gas turbine engine 100 of an aircraft, the gas turbine engine comprising modules including an engine core module 140 that houses a high pressure compressor 108 and a turbine module 150 that houses a high pressure turbine 112 and a low pressure turbine 116. That method comprises the steps of:

(i) positioning a gas turbine engine maintenance stand 200 under the gas turbine engine 100 to be maintained;

(ii) moving the gas turbine engine from the aircraft onto the gas turbine engine maintenance stand 200;

(iii) detachably engaging the engine core module support arms 230 of the gas turbine engine maintenance stand to the engine core module 140 of the gas turbine engine;

(iv) detachably engaging the turbine module support arms 245 of the gas turbine engine maintenance stand to the turbine module of the gas turbine engine;

(v) removing one or more modules of the gas turbine engine whilst supporting the engine core in the gas turbine engine maintenance stand;

(vi) reassembling the gas turbine engine 100 once maintenance is complete;

(vii) detaching the engine core module support arms 230 and the turbine module support arms 245 from the gas turbine engine; and (viii) returning the gas turbine engine 100 back onto the aircraft.

Advantages of the gas turbine engine maintenance stand, including the embodiment described above, and method of the present disclosure described above include:

The gas turbine engine maintenance stand can be easily disassembled for allow of cost effective transportation globally and then easily re-assembled for use in one-engine build, maintenance, repair and overhaul (MRO) or near wing facilities.

The gas turbine engine maintenance stand enables a gas turbine engine to be stripped module by module as desired in a manner that enables safe and flexible working around the gas turbine engine. For example, of the stand enables substantially unrestricted access to port, starboard, fore and aft portions of the gas turbine engine. Engine turnaround times can be significantly shorter over conventional methods, potentially saving about four days.

The simplicity of the design of the bolted structure enables the stand to be easily and quickly manufactured and able to provide surgical strike capability in a period of weeks. Known gas turbine engine maintenance stands tend to be more complex and costly to manufacture and thus fail to yield the same cost and lead time benefits that the gas turbine engine maintenance stand of the present disclosure provides.

Structural sections terminated in a way that provides error proof assembly whilst ensuring structural integrity is maintained. Due to the section size handling points may be added to assist with the assembly and disassembly process.

The gas turbine engine maintenance stand can be shipped in the lower hold of passenger carrying air craft as the overall package size can be modified to suit particular positions.

Once the gas turbine engine maintenance stand has been delivered to the required location it can be built up with minimal infrastructure e.g. two spanners and two sockets.

Once assembled the engine can be bootstrapped directly from the plane into the gas turbine engine maintenance stand. No units are required to be removed to facilitate the use of the stand.

The fan case module can removed from the gas turbine engine using the gas turbine engine maintenance stand without having to remove the intake module.

Multiple units can be stacked.

Considerable reduction in manufacturing lead time and cost.

Avoids the need to transport a large welded assembly.

Avoids the need to restrict transportation to cargo flights. Embodiments of the gas turbine engine maintenance stand of the present disclosure can be shipped on conventional airfreight pallets. Some embodiments can be shipped in standard lower deck airfreight containers.

Use of shaped structural sections creates the desired geometry and structural integrity without requiring the entire stand to be a welded assembly.

Profiles cut in the shaped structural sections provide strength. Material sections can be inserted through the joints to provide additional structural strength where desired.

The method of the present disclosure significantly reduces the turnaround time when working on gas turbine engines and deployment costs and lead time through the design philosophy are a fraction of that associated with conventional tooling and methods.

The method enables a gas turbine engine to be stripped to a modular level in a manner that enables flexible working around the gas turbine engine for maintenance purposes.

It will be understood that the invention is not limited to the embodiments above-described and various modifications and improvements can be made without departing from the concepts described herein.

We claim:

1. A gas turbine engine maintenance stand for a gas turbine engine with detachable modules including an engine core module that houses a high pressure compressor and a turbine module that houses a low pressure turbine, the gas turbine engine maintenance stand comprising:

a pair of base beams, each base beam having a first end, a midsection and a second end;

an engine core module support that straddles the pair of base beams at each respective midsection, the engine core module support having engine core module support arms that directly attach to the pair of base beams at a bottom surface of the engine core module support arms opposite to a position at which the engine core module support arms are configured to engage opposing sides of the engine core module of the gas turbine engine; and a turbine module support that straddles the pair of base beams adjacent to each respective second end, the turbine module support having turbine module support arms that are attached to a balance beam, the balance beam being attached to a pivot at a longitudinal center of the balance beam, the pivot at the longitudinal center of the balance beam being attached to a cross beam that spans between the pair of base beams at the respective second ends, and the turbine module support arms being configured to engage opposing sides of the turbine module of the gas turbine engine.

2. The gas turbine engine maintenance stand according to claim 1, wherein each engine core support arm is braced against one of the pair of base beams by one or more structural support members.

3. The gas turbine engine maintenance stand according to claim 1, wherein the engine core module support has a mid-portion that connects the engine core module support arms and each engine core module support arm is braced against the mid-portion of the engine core module support by one or more structural support members.

4. The gas turbine engine maintenance stand according to claim 1, wherein each engine core support arm has an engine core module grip assembly that is configured to securably engage the engine core module of the gas turbine engine.

5. The gas turbine engine maintenance stand according to claim 1, wherein the turbine module support includes at least one hinge that is configured to reduce torsion when connecting the turbine module support to the turbine module.

6. The gas turbine engine maintenance stand according to claim 1, wherein each turbine support arm has a turbine module grip assembly that is configured to securably engage the turbine module of the gas turbine engine.

7. The gas turbine engine maintenance stand according to claim 1, wherein the turbine module support is detachable from the gas turbine engine maintenance stand.

8. The gas turbine engine maintenance stand according to claim 1, wherein each base beam of the pair of base beams has a plurality of wheel assemblies.

9. The gas turbine engine maintenance stand according to claim 1 is flat-packable.

10. The gas turbine engine maintenance stand according to claim 1, wherein the engine core module support is configured to engage the engine core module, which houses or detachably includes one or more of a low pressure compressor and an intermediate pressure compressor.

11. The gas turbine engine maintenance stand according to claim 1, wherein the turbine module support is configured to engage the turbine module, which houses or detachably includes an intermediate pressure turbine.

12. The gas turbine engine maintenance stand according to claim 1, wherein either the engine core module support or the turbine module support is configured to engage with the engine core module which also houses or detachably includes a high pressure turbine.

13. A method of maintaining a gas turbine engine of an aircraft, the gas turbine engine having modules including an engine core module that houses a high pressure compressor and a turbine module that houses low pressure turbine, the method comprising the steps of:

positioning the gas turbine engine maintenance stand of claim 1 under the gas turbine engine to be maintained;
moving the gas turbine engine from the aircraft onto the gas turbine engine maintenance stand;
detachably engaging the engine core module support arms of the gas turbine engine maintenance stand to the engine core module of the gas turbine engine;
detachably engaging the turbine module support arms of the gas turbine engine maintenance stand to the turbine module of the gas turbine engine;
removing one or more modules of the gas turbine engine while supporting the engine core in the gas turbine engine maintenance stand;
reassembling the gas turbine engine after maintenance is complete;
detaching the engine core module support arms and the turbine module support arms from the gas turbine engine; and
returning the gas turbine engine back onto the aircraft.

14. A kit of parts comprising the pair of base beams, the engine core module support, and the turbine module support, the kit forming the gas turbine engine maintenance stand of claim 1.

15. The kit of parts of claim 14 that is flat-packed in a storage container.

16. A gas turbine engine maintenance stand for a gas turbine engine with detachable modules including an engine core module that houses a high pressure compressor and a turbine module that houses a low pressure turbine, the gas turbine engine maintenance stand comprising:
  a pair of base beams, each base beam having a first end, a midsection and a second end;
  an engine core module support that straddles the pair of base beams at each respective midsection, the engine core module support having engine core module support arms that are configured to engage opposing sides of the engine core module of the gas turbine engine; and
  a turbine module support that straddles the pair of base beams adjacent to each respective second end, the turbine module support having turbine module support arms that are attached to a balance beam, the balance beam being attached to a pivot at a longitudinal center of the balance beam, the pivot at the longitudinal center of the balance beam being attached to a cross beam that spans between the pair of base beams at the respective second ends, and the turbine module support arms being configured to engage opposing sides of the turbine module of the gas turbine engine.

\* \* \* \* \*